United States Patent
Katsuki et al.

(10) Patent No.: US 7,174,268 B2
(45) Date of Patent: Feb. 6, 2007

(54) WIRELESS MEASURING DEVICE

(75) Inventors: Shozo Katsuki, Yamaguchi (JP); Yutaka Saitoh, Tokyo (JP); Tsutomu Tanaka, Tokyo (JP); Akira Ohnishi, Tokyo (JP); Sumitaka Tachikawa, Atsugi (JP)

(73) Assignees: Ube Industries Ltd., Yamaguchi (JP); Takion Co., Ltd., Tokyo (JP)

( * ) Notice: Subject to any disclaimer, the term of this patent is extended or adjusted under 35 U.S.C. 154(b) by 0 days.

(21) Appl. No.: 11/206,157

(22) Filed: Aug. 18, 2005

(65) Prior Publication Data

US 2006/0052987 A1  Mar. 9, 2006

(30) Foreign Application Priority Data

Aug. 18, 2004  (JP)  ............................. 2004-238897

(51) Int. Cl.
*G06F 15/00* (2006.01)
(52) U.S. Cl. ...................................... 702/131; 702/130
(58) Field of Classification Search ................ 702/127, 702/131, 130
See application file for complete search history.

(56) References Cited

U.S. PATENT DOCUMENTS 6,553,336 B1 * 4/2003 Johnson et al. ............. 702/188
2002/0031101 A1 * 3/2002 Petite et al. ................. 370/310
2002/0175820 A1 * 11/2002 Oja et al. .................. 340/573.4

FOREIGN PATENT DOCUMENTS

JP  2004-013572  1/2004

* cited by examiner

*Primary Examiner*—John Barlow
*Assistant Examiner*—Douglas N Washburn
(74) *Attorney, Agent, or Firm*—Young & Thompson

(57) ABSTRACT

A wireless measuring device 1 is provided which includes a plurality of child units 2 and a parent unit 3 to receive data measured by these child units 2 by wireless communication. Each of the child units 2 has a controlling section 20 that can move to a standby state, a measuring section 21, a signal receiving section 22 to receive a measurement instructing signal from the parent unit 3, and a signal transmitting section 23 to transmit the measured data by wireless communication. The parent unit 3 has a signal transmitting section to transmit the measurement instructing signal to each of the child units 2 and a measured data receiving section 32 to receive measured data to be transmitted from the signal transmitting section 23.

12 Claims, 7 Drawing Sheets

WIRELESS MEASURING DEVICE

BACKGROUND OF THE INVENTION

1. Field of the Invention

The present invention relates to a wireless measuring device to collect measured data obtained by measuring a physical quantity of a temperature or the like at a plurality of places.

2. Description of the Related Art

In the case where a characteristic of a temperature or the like is measured at many places reaching several tens of places or more and profiling of the measured result is performed, if a cable is used for receiving and transmitting a measuring signal, there are some cases in which wiring work of the cable requires much time and labor depending on some subjects to be measured and/or on some environments in which a measuring device is installed and the wiring work itself is made difficult. For example, in a thermal vacuum test for an artificial satellite, temperatures must be measured at 500 to 1000 places and a period of one month or more is required only for wiring work in some cases. Technology generally called a "telemetering (wireless measurement)" method is known (disclosed in, for example, Japanese Patent Application Laid-open No. 2004-13572) in which receiving and transmitting of data obtained by measurement at many measuring places are achieved by wireless communication.

A conventional measuring device employing the telemetering technology is classified roughly into two types. One is a device whose child unit has a function of receiving and transmitting signals and another is a device whose child unit has a function of only transmitting signals. The child unit of the former is in a receiving state all the time with the aim of receiving a measurement instructing signal from a parent unit. Therefore, a small-sized child unit using a battery, due to rapid consumption of the battery, is unsuitable for long time or long period measurement. The latter transmits measured data using a timer embedded in its child unit as a reference for measurement. In this case, errors always occur in the timer which causes transmitting timing to coincide among child units and a collision to occur among pieces of measured data, thus inducing a fear of failing to capture measured data.

SUMMARY OF THE INVENTION

In view of the above, it is an object of the present invention to provide a highly-reliable wireless measuring device which is capable of collecting data obtained by measurement at many places for a long time without failing to capture the data.

The above object is achieved by the wireless measuring device including a plurality of child units each having a specified identifier and a parent unit to receive data measured by the child units by wireless communication, wherein each of the child units has a controlling section that can move to a standby state, a measuring unit, a measurement instructing signal receiving unit to receive a measurement instructing signal from the parent unit, and a measured data transmitting unit to transmit data measured by the measuring unit by wireless communication and wherein the parent unit has a measurement instructing signal transmitting unit to transmit the measurement instructing signal to the child units by wireless communication and a measured data receiving unit to receive the measured data transmitted from the measured data transmitting unit and wherein the child unit is so configured that the controlling unit of the child unit is put into a driving state from a standby state in every determined time and, when the measurement instructing signal receiving unit receives the measurement instructing signal, transmits data measured by the measuring unit to the parent unit in synchronization with individual transmission start time determined based on the identifier of each of the child units by using, as a reference time, transmission start reference time obtained based on reference time data contained in the measurement instructing signal.

According to the wireless measuring device of the present invention, data obtained by measurement at many places can be collected in a stable manner for a long period without failing to capture the data.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Figure 1:
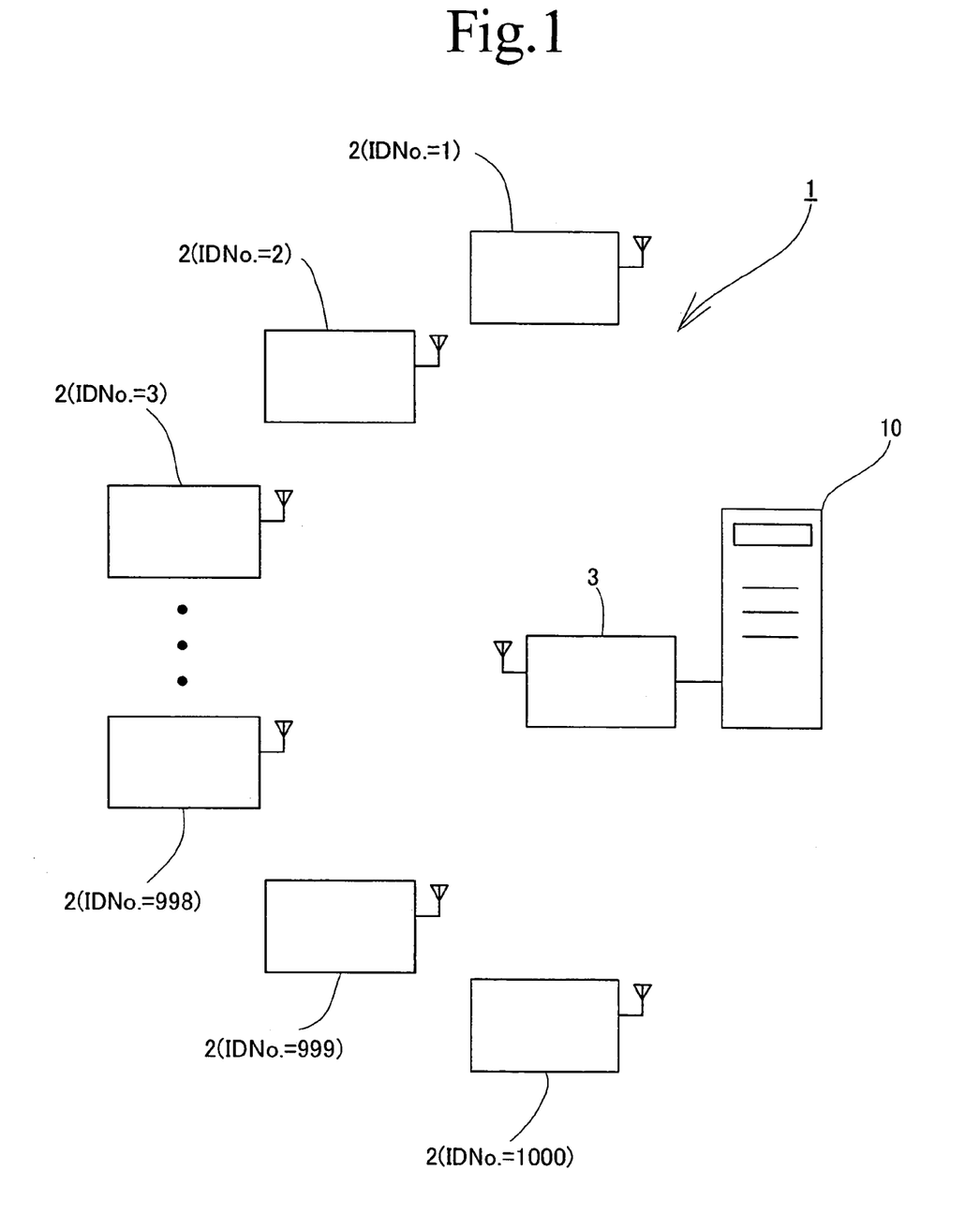
FIG. 1 is a diagram schematically showing a wireless measuring device of an embodiment of the present invention.

FIG. 1 is a diagram showing an embodiment in which the wireless measuring device of the present invention is applied to a wireless temperature measuring device (hereinafter called a measuring device). The reference number 1 in FIG. 1 shows the measuring device. The measuring device 1 has a plurality of child units 2 (ID No.=1, 2, 3, . . . 998, 999, 1000) for measurement, each having a specified identification number (identifier) and a parent unit 3 to receive data measured by these child units 2 by wireless communication.

Figure 2:
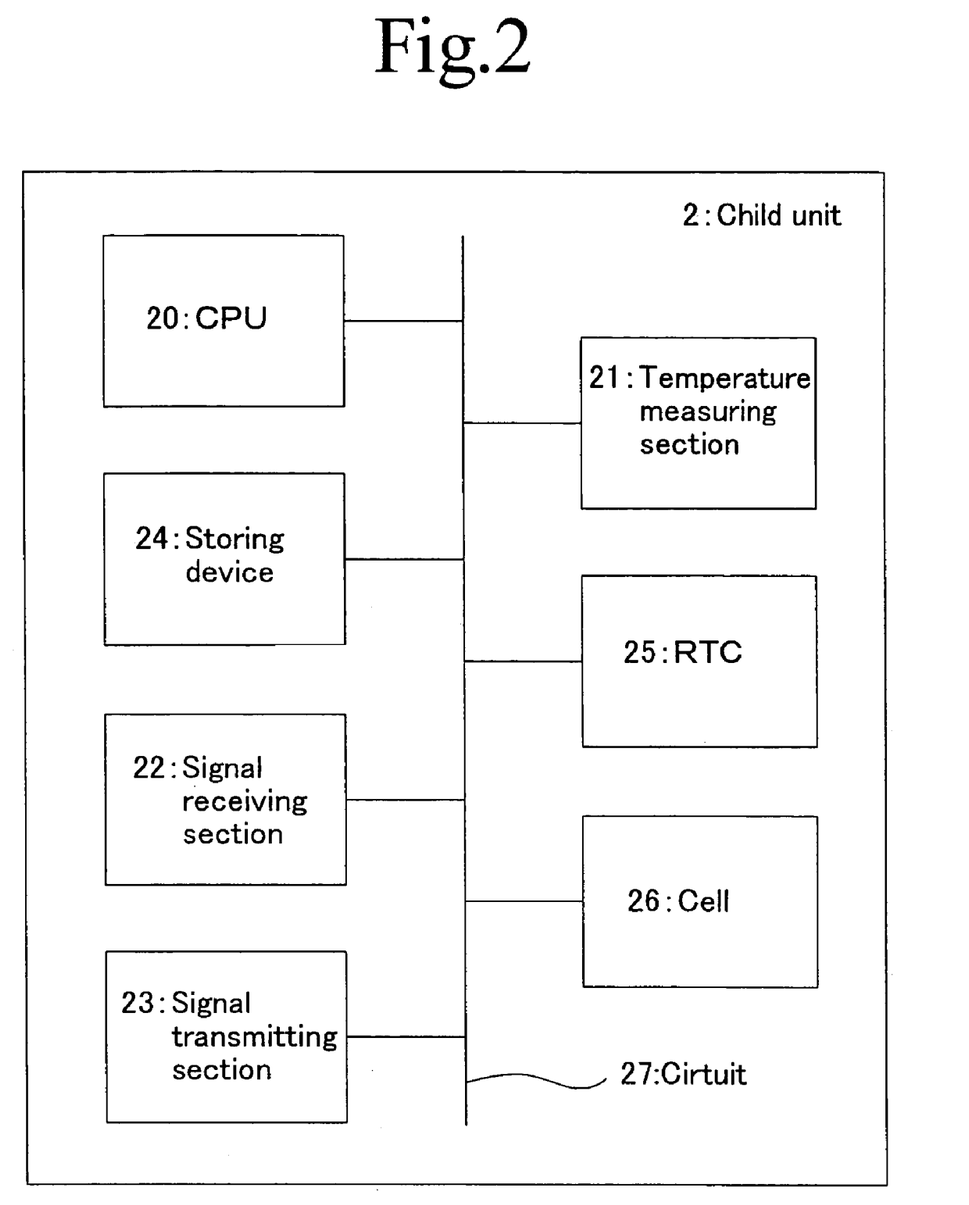
FIG. 2 is a diagram schematically showing configurations of a child unit of the wireless measuring device of the embodiment of the present invention.

As shown in FIG. 2, the child unit 2 is a measuring unit equipped with a microcomputer and includes a controlling section (CPU) 20 which is able to move to a standby state, a temperature measuring section (hereinafter simply called a "measuring section") 21, a signal receiving section (measurement instructing signal/synchronization signal receiving section) 22 to receive a measurement instructing signal and a synchronization signal from the parent unit 3, a signal transmitting section (measured data transmitting section) 23 to transmit signals containing data measured by the measuring section 21 by wireless communication, a storing device 24, an external timer (RTC) 25, a cell (power source) 26, and a circuit 27 to connect these components. The storing device 24 stores the above-described identification number, the number of counting operations at reference time described later, and programs to make the child unit 2 operate such as an operation time table described later.

Figure 3:
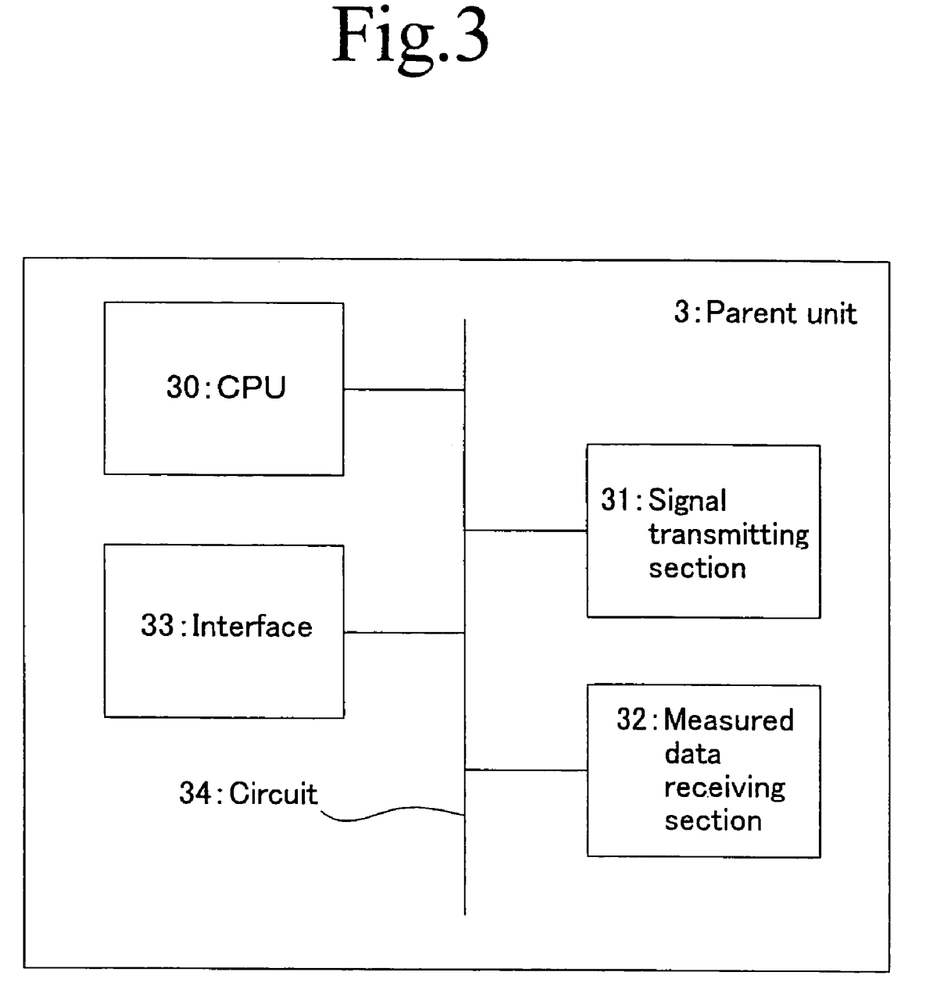
FIG. 3 is a diagram schematically showing configurations of a parent unit of the wireless measuring device of the embodiment of the present invention.

As shown in FIG. 3, the parent unit 3 includes a controlling section (CPU) 30, a signal transmitting section (measurement instructing signal/synchronization signal transmitting section) 31 to transmit a measurement instructing signal to be fed from the controlling section 20 to the child unit 2 by wireless communication, a measured data receiving section 32 to receive the measured data transmitted from the signal transmitting section 23, an interface 33 to output measured data received by the measured data receiving section 32 to the outside, and a circuit 34 to connect these circuits. The parent unit 3 is connected to a host computer system (hereinafter simply called a "host computer") 10 (see FIG. 1) such as a personal computer or the like via the interface 33. The controlling section 30 of the parent unit 3 exerts control, according to an instruction from the host computer 10, so that a measurement instructing signal is transmitted to the child unit 2 via the signal transmitting section 31 at every necessary measuring time and synchronization signal described later; and so that measured data being transmitted from each of the child units 2 is received by the measured data receiving section 32 which is transmitted to the host computer 10 via the interface 33.

Figure 4:
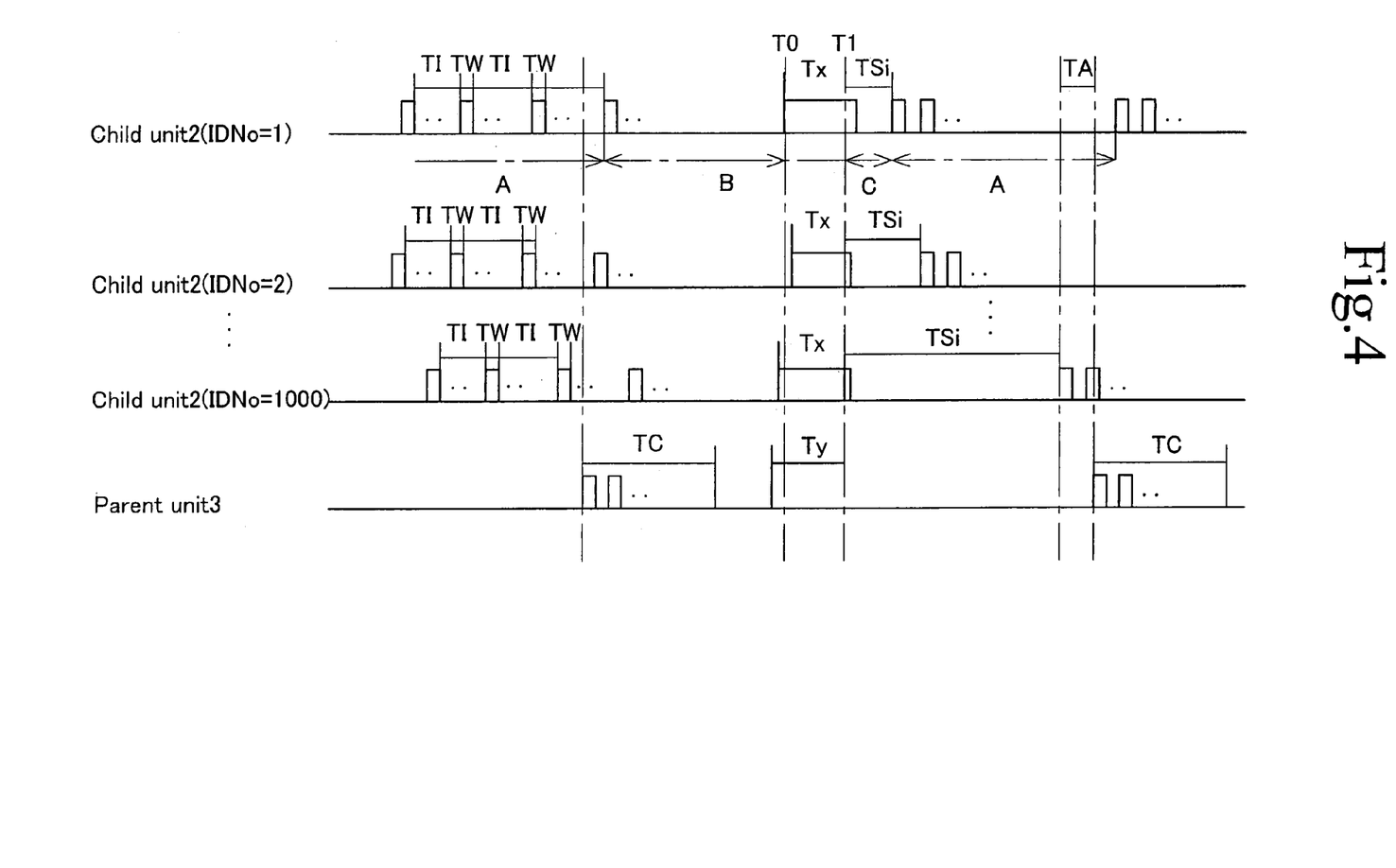
FIG. 4 is a diagram schematically showing an operation time table of the child unit and parent unit of the wireless measuring device of the embodiment of the present invention.
Figure 5:
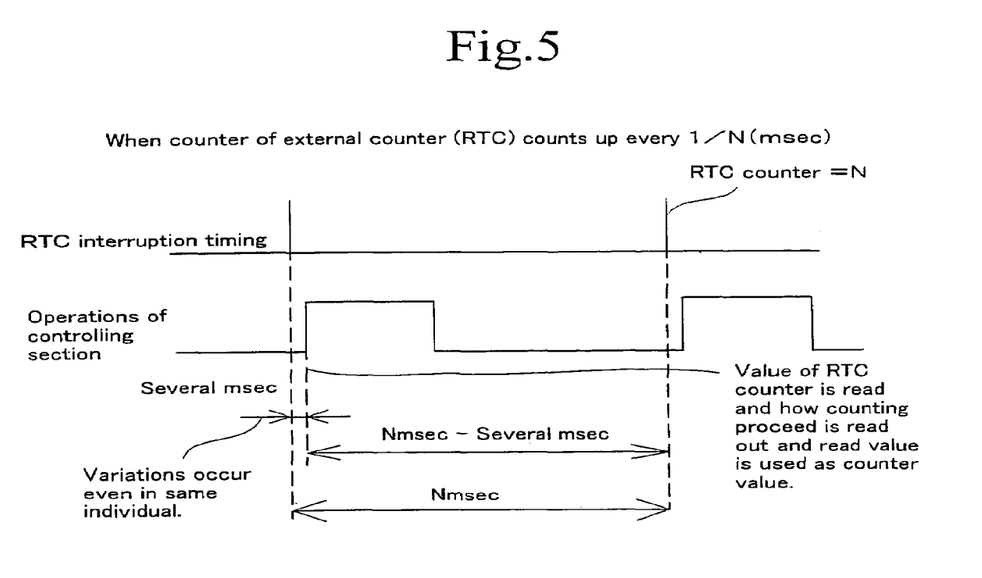
FIG. 5 is a diagram schematically showing an operation time table of an external timer and controlling section to explain compensation for a time delay associated with movement of the wireless measuring device from its standby state to its driving state.

FIG. 4 is a diagram schematically showing an operation time table of each of the child unit 2 and parent unit 3 based on the timing of interruption of each of the controlling units 20 and 30 of the child unit 2 and parent unit 3 respectively in the wireless measuring device of the embodiment of the present invention. FIG. 5 is a diagram schematically showing an operation time table of an external timer and controlling section to explain compensation for a time delay associated with movement of the wireless measuring device from its standby state to its driving state. As shown in FIGS. 4 and 5, an interval of interruption of the controlling section 20 in the child unit 2 is set so as to differ among three time sections including the first time interval A during which the measurement instructing signal is waited for, the second time interval B being a period between time of a receipt of the measurement instructing signal and transmission start reference time T0 described later, and the third time interval C being a period between the transmission start reference time T0 and data transmission.

An interruption interval in the first time section A is set in a manner in which consumption of a cell is to be suppressed by driving each of the child units 2 at a necessary and minimum level. The interruption interval in the first time section A is determined by a driving interval TI from a standby state (so called a "sleep mode") of the controlling section 20 and by a driving time (measurement start signal receiving time) TW. In the embodiment, the driving time TI is set at 3 sec and the driving time TW is set at 48 msec. The second time section B is set in a manner in which an accuracy of time existing before transmitting start reference time T0 of each of the child units 2 in the second time section B is improved. The interruption interval in the second time section B is set to be the same as an interruption interval of the controlling section 30 in the parent unit 3. In the embodiment, the interruption interval in the second time section B is set at 16 msec. The interruption interval in the third time section C is set in a manner in which measured data is transmitted without a collision among data to each of the child units 2 just having been put into a driving state from a standby state. The interruption interval in the third time section C is set in a manner in which a variation error between measured data transmitting time of each of the child units 2 and time required for stable operations of an interval time (master clock) of the controlling section and a standby state of controlling section 20, and the number of child units 2 are taken into consideration. In the embodiment, the measured data transmitting time is set at 34 msec, the variation error at ±30 μ sec, the number of child units 2 at 1000, and the interruption interval in the third time section C at 100 msec.

As shown in FIG. 4, the controlling section 20 of the child unit 2, after having been put into a driving state from its standby state every pre-determined driving interval TI for a period of the driving time TW, repeats operations of moving again to a standby state until receiving a transmission instructing signal from the parent unit 3. The transmission time TC of a measurement instructing signal to be fed from the parent unit 3 is set according to the driving interval TI and the driving time TW and is set, from a viewpoint of preventing a receiving mistake, in a manner in which the driving time TW exists, for example, twice within transmitting time TC of the measurement instructing signal. In the embodiment, the transmitting time TC is set at 6.2 sec. In this standby state, the controlling section is put into a stop state, however, the external timer 25 continues to operate, as it is, by power to be supplied from a cell.

In each of the child units 2, as described above, its controlling section 20 is changed from its standby state to its driving state in every pre-determined time for operations and its measuring section 21 measures temperatures when its signal receiving section 22 receives the measurement instructing signal to be transmitted during the transmitting time TC and stores measured data in the internal memory of the controlling section 20. Then, by making a correction to the transmission start time T0 to be calculated based on reference time data contained in the measurement instructing signal, according to a synchronization signal to be transmitted from the parent unit 3 so that new transmission start time is produced, and by using the produced new transmission start time as a reference time, data measured by the measuring section 21 is transmitted to the parent unit 3 in synchronization with individual transmission start time TSi to be determined based on an identification number of each of the child units 2. Each of the child units 2 is again put into the same standby state as above till the time when receiving a synchronization signal from the parent unit 3 after having stored measurement data and till the transmission start time TSi after having transmitted the synchronization signal. The above reference time data is a counter value which is generated by the parent unit 3 in accordance with an instruction signal fed from the above host computer which increments every moment and the generated counter value is transmitted, together with the measurement instructing signal, from the parent unit 3 to each of the child units 2. Immediately after the child unit 2 receives a head of a measurement instructing signal to be transmitted within transmission time TC from the parent unit 3 during the second time section B, the child unit 2 recognizes the received signal as a reference signal and is put into a standby state until receiving a synchronization signal from the parent unit 3. Each of the child units 2 is being driven for the maximum 48 msec until recognizing the head signal and, during the time, receives from the parent unit 3 and recognizes the head signal.

The storing device 24 of each of the child units 2 has a counting number C0 obtained at a reference time which corresponds to a transmitting start reference time T0. The counting number C0 obtained at the reference time is determined based on transmitting time TC of a measurement instructing signal fed from the parent unit 3 and time (in the embodiment, analog-to-digital conversion time in temperature measurement: 800 msec) required for capturing data from the measuring section 21.

Moreover, in the above embodiment, each of the child units 2 is so configured that a time delay occurring while the controlling section 20 changes from its standby state to its driving state is compensated for in a manner to match real time. That is, in the embodiment, as shown in FIG. 5, the controlling section 20 reads out how counting by the external timer 25 proceeds when driven during a standby period due to an interruption timing signal fed from the external timer 25 and compensates for the time delay indicated by the internal timer, by using the read counter value as a counter value of its own internal timer, in a manner to match real time, in other word, the time shown by the external timer 25. Thus, by compensating for the time delay occurring while the controlling section 20 changes from its standby state to its driving state, it is made possible to capture measured data accurately in a short time in measurement using many child units 2.

In the measuring device 1 of the embodiment, as the measurement instructing signal, a signal representing a count number indicated by the counter of the controlling section 30 corresponding to an interruption interval TM of the controlling section 30 of the parent unit 3 is employed and, according to an instruction fed from the host computer 10, signals representing the count number C (=TC/TM) are transmitted to each of the child units 2, all at once, during a predetermined transmitting time TC. In the embodiment, the interruption interval TM of the controlling section 30 is set at 16 msec and the count number C at 1 to 388. When the transmission of the signals representing the count number C is terminated, the controlling section 30 resets the counter and the parent unit 3 is put into a state in which transmission of a synchronization signal is waited for.

Next, the parent unit 3 transmits a synchronization signal to put the transmission start reference time into a synchronized state, to the child unit 3. The synchronization signal is a signal of transmission time Ty containing transmission start reference time T0, and the transmission time Ty is set based on a maximum value of re-driving time Tx containing variations in the transmission start reference time T0 for all the child units 2 and, in the embodiment, the transmission time Ty is set at 96 msec. Moreover, the synchronization signal transmission start time is set on the basis of an actual result value of the variation in each of the child units 2 employing a variation error of time constant of electronic parts making up all the child units 2, circuit design, or the like, and is set at time being earlier than the above actual result time.

The parent unit 3, after having transmitted a synchronization signal, is put into a state in which receiving of measured data is waited for. The state in which the receiving of measured data is waited for, after having received the measured data from all child units 2, continues till reserve time for safety. In the embodiment, transmission interval time of each of the 1000 child units 2 is set at 100 msec and the reserve time to be taken after having received measured data (after 8 seconds for the first child unit to 107 seconds for the 1000th child unit) is set at 1 second.

Then, the controlling section 20 of each of the child units 2, after having received the count numbers C represented by an measurement instructing signal from the parent unit 3, adds a count numbers C of its own internal timer to the received count number C. Then, the controlling section 20 of each child unit 2 compares the count number Ci with a reference count number while incrementing the count number Ci of the counter by one for every interruption interval of the controlling section 20 and, a time point at which the count number Ci reaches the count number C0 obtained at the reference time, that is, the transmission start reference time is used as reference time for operations. Each of the child units 2 is driven at the transmission start reference time T0. In the embodiment, a synchronization signal is received from the parent unit 3 at the time of driving the child unit 2 and new transmission start reference time calculated based on the received synchronization signal is used, instead of the above transmission start reference time T0, as new transmission start reference time, that is, the time when the transmission of the synchronization signal is terminated is used as the transmission start reference time and the count number C0 of the counter is reset and the new transmission reference time is employed as reference time for transmission start time TSi for measured data. Then, time obtained by multiplying an identification number of each child unit 2 by an interruption interval in the third time section C is used as the transmission start time TSi (for example, in the case in which an identification number of the child unit 2 is 50, TSi=50×100 msec=5 sec) and the data (temperature data, identification number or the like) to be measured by the measuring section 21 is transmitted to the parent unit 3 in synchronization with the transmission start time TSi obtained by using the new transmission reference time as the reference time. Thus, by performing operations in synchronization with the transmission start reference time, occurrence of a collision caused by an error occurring due to a slight difference in time constant of electronic components or the like making up each of the child units 2 is prevented to achieve ensured avoidance of a failure in measured data. This enables transmission interval time of each of the child units 2 and reserve time TA for safety to be shortened and, according to the embodiment, measurement at a rate of 6000 channels/2 minutes can be achieved. Each of the child units 2 is again put into a standby state in which each of the child units 2 waits for receiving a measurement instructing signal to be transmitted from the parent unit 3 for a period between correction to be made to transmission start reference time and transmission start time TSi and after each measured data is transmitted in a manner to match the transmission start time.

The measuring device 1 of the embodiment is so configured that the measurement instructing signal to be fed from the signal transmitting section 31 is transmitted at a carrier frequency being different from that of the measured data to be fed from the measuring data transmitting section 23. The carrier frequency is set based on measuring environments, for example, on a distance between the child unit 2 and parent unit 3, and on a frequency of a noise occurring under the measuring environments.

The parent unit 3 having received measured data transmitted, with a time difference, from the signal transmitting section 22 of each of the child units 2 transfers measured data through the interface 33 to the host computer 10.

As described above, according to the measuring device 1 of the embodiment, its controlling section 20 is put from its standby state into its driving state every determined time and, when its measurement instructing signal receiving section receives a measurement instructing signal, transmits data measured by the measuring section 21 to the parent unit 3 by using a transmission start reference time T0 obtained based on the measurement instructing signal as reference time in synchronization with individual transmission start time TSi determined based on an identification number of each of the child units 2 and, therefore, each of the child units 2 remains in a standby state except when being driven. As a result, it is made possible to greatly reduce consumption power when compared with the case of the conventional measuring unit. Additionally, measured data to be transmitted from each of the child units 2 has regularity based on its identification number and the parent unit 3 can collect the measured data without collision. Moreover, the transmission start reference time is corrected by a synchronization signal fed from the parent unit 3 and, therefore, it is made possible to prevent a failure in capturing of measured data caused by an error occurring due to a slight difference in time constant of the child unit 2. Therefore, data measured at many places up to 1000 can be collected in time as short as about 100 seconds or more for a long time without failing to capture the measured data. Furthermore, a time delay occurring during a period from when the controlling section 20 is in a standby state to when the controlling section 20 is in a driving state can be compensated for, thus enabling highly-reliable gathering of measured data.

It is apparent that the present invention is not limited to the above embodiments but may be changed and modified without departing from the scope and spirit of the invention. For example, the physical quantity to be measured by the measuring section being mounted in each child unit is not limited to a temperature and also includes the physical quantity that can be measured including a humidity, pressure, voltage, current, amount of light, and magnetic force or the like.

Figure 6:
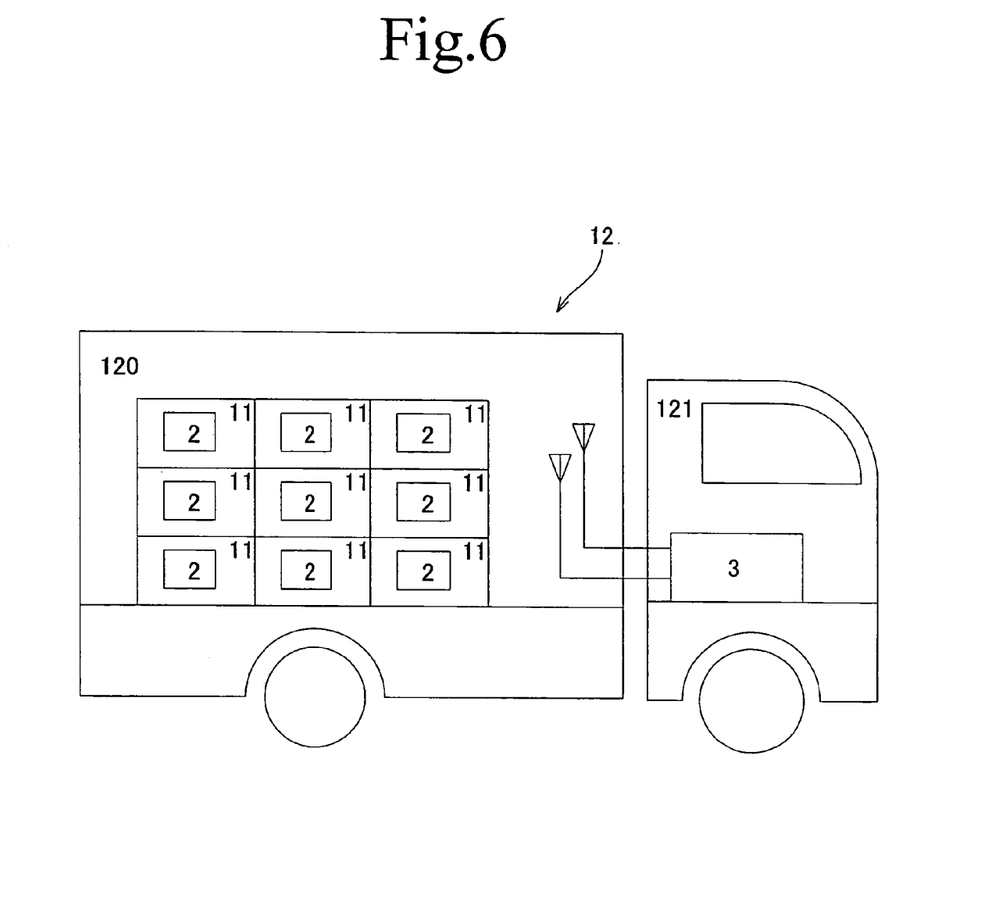
FIG. 6 is a diagram schematically showing one example in which the wireless measuring device of the present invention is applied to management (monitoring) of distributed products.

Moreover, the measuring device of the present invention may be configured in a manner in which its child unit has a measuring data storing section to store measured data and in which the child unit transmits measured data to a parent unit while storing the measured data to be transmitted also to the measured data storing section, which enables the child unit itself to trace a history of measurement. Also, by configuring the measuring device of the present invention so that the child unit 2 can grasp a measuring history as described above and, as shown in FIG. 6, for example, each of the child units 2 is attached to each distributed product 11 and an antenna of each of the measurement instructing signal transmitting section and the measured data receiving section of the parent unit 3 is attached to a pallet 120 of a wagon 12 that carries the distributed product 11, and a main body of the parent unit 3 is mounted on a driver's seat 121 which enables a driver to monitor measured data from the driver's seat 121 and the measuring history to be read by the reading means of the measuring history at a time point when a distributed product 11 is carried in at a place to which the distributed product 11 is to be carried, it is made possible to immediately grasp a history of product quality.

Figure 7:
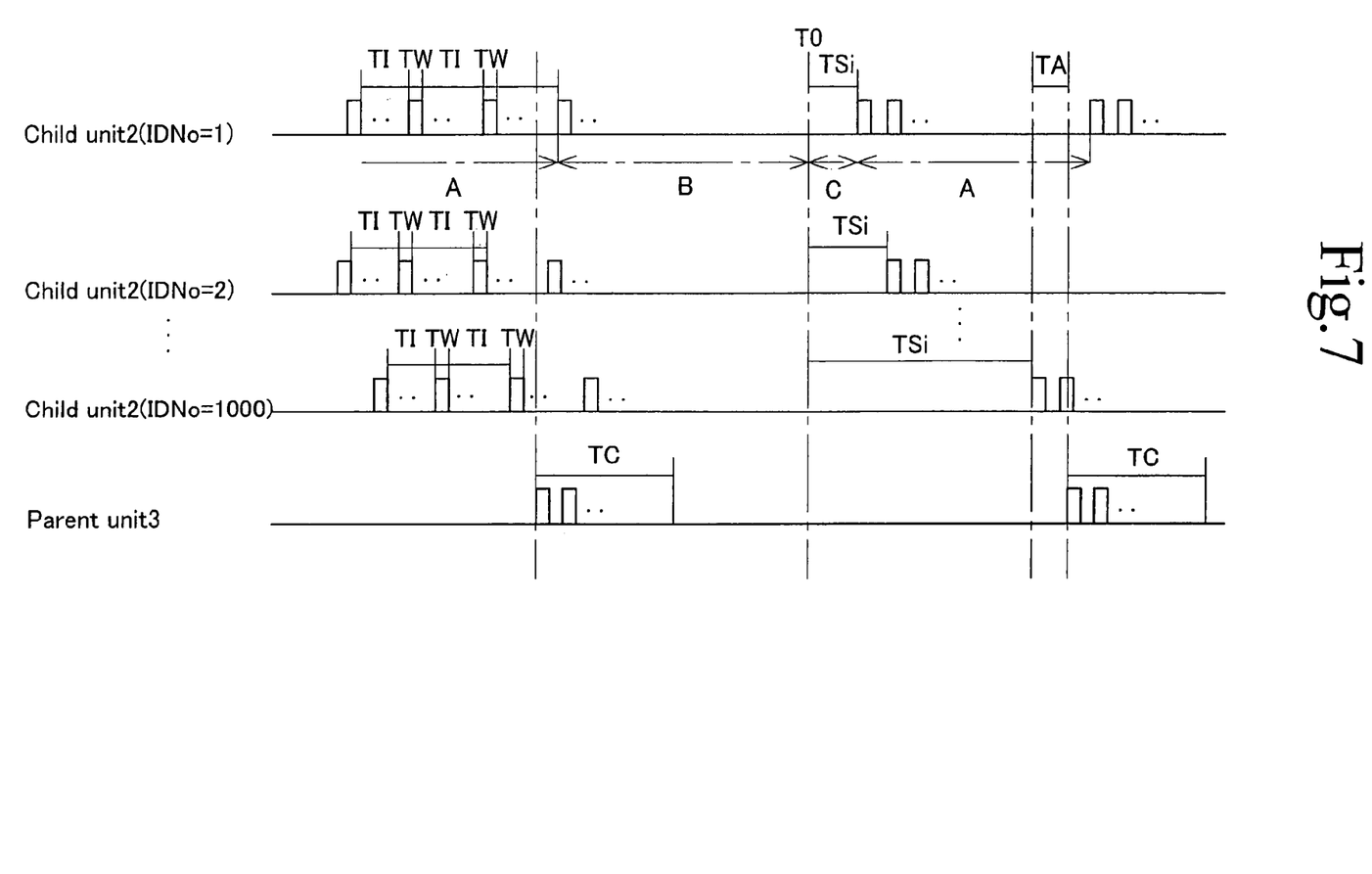
FIG. 7 is a diagram schematically showing an operation time table of the child unit and parent unit employed in the wireless measuring device of the present invention.

Moreover, it is preferable that the transmission start reference time of the child unit 2 is corrected according to a synchronization signal to be transmitted from the parent unit 3 as in the case of the above embodiment; however, if the number of child units 2 that is used is small, the correction may be omitted and the child unit 2 and parent unit 3 may be operated according to, for example, the operation table as shown in FIG. 7.

Additionally, as described in the above embodiment, it is preferable that the child unit 2 has a function of compensating for a time delay occurring between a standby state and a driving state of the controlling section. However, if a time interval of the child unit 2 is large, if transmission time of the child unit is small, or if the number of child units 2 that measures at one time is small, the function of compensating for the time delay may be omitted.

The parent unit may include a storing device which stores programs to make the parent unit 3 operate in cooperation with the host computer such as an operation time table described above during execution of the programs. Furthermore, in the above embodiment, the parent unit 3 and the host computer are constructed separately, however, the parent unit 3 and the host computer may be integrally configured.

The wireless measuring device of the parent invention, as described above, can be applied to, in addition to simple measurement of a physical quantity of a temperature, or the like, quality control (monitoring) of distributed products in a distributed process, storage of foods, medications, mining materials such as electronic materials, management of a body temperature, blood pressure, heart rate, or the like in medical institutions, management of agricultural products including a flower, fruit, or the like, management of breeding domestic animals including a cow, horse, pig, sheep, chicken, or the like.

What is claimed is:

1. A wireless measuring device comprising:
   a plurality of child units each having a specified identifier; and
   a parent unit to receive data measured by the child units by wireless communication;
   wherein each of said child units comprises a controlling section that can move to a standby state, a measuring unit, a measurement instructing signal receiving unit to receive a measurement instructing signal from said parent unit, an external timer and a measured data transmitting unit to transmit data measured by said measuring unit by wireless communication,
   wherein said parent unit comprises a measurement instructing signal transmitting unit to transmit the measurement instructing signal to said child units by wireless communication and a measured data receiving unit to receive the measured data transmitted from said measured data transmitting unit,
   wherein said child unit is so configured that said controlling unit of said child unit is put into a driving state from a standby state in every determined time and, when said measurement instructing signal receiving unit receives the measurement instructing signal, transmits data measured by said measuring unit to said parent unit in synchronization with individual transmission start time determined based on the identifier of each of said child units by using, as a reference time, transmission start reference time obtained based on reference time data contained in said measurement instructing signal, and
   wherein said child unit is so configured that a time delay occurring between a standby state and a driving state of said controlling unit is compensated for in a manner to match real time shown by the external timer.

2. The wireless measuring device according to claim 1, wherein said parent unit has a synchronization signal transmitting unit to transmit, by wireless communication, a synchronization signal to synchronize said transmission start reference time to said child unit and wherein said child unit has a synchronization signal receiving unit to receive said synchronization signal transmitted from said synchronization signal transmitting unit and wherein the measured data is transmitted by using new transmission start reference time based on the received synchronization signal, as a reference time, instead of the transmission start reference time.

3. The wireless measuring device according to claim 1, wherein said measured data is transmitted by said measuring data transmitting unit at a frequency being different from a frequency at which said measurement instructing signal is transmitted by said measurement instructing signal transmitting unit.

4. The wireless measuring device according to claim 1, wherein each of said child units has a measured data storing unit to store measured data.

5. The wireless measuring device according to claim 1, wherein said measuring unit is a temperature measuring unit.

6. The wireless measuring device according to claim 2, wherein said child unit is so configured that a time delay occurring between a standby state and a driving state of said controlling unit is compensated for in a manner to match real time.

7. The wireless measuring device according to claim 2, wherein said measured data is transmitted by said measuring data transmitting unit at a frequency being different from a frequency at which said measurement instructing signal is transmitted by said measurement instructing signal transmitting unit.

8. The wireless measuring device according to claim 2, wherein each of said child units has a measured data storing unit to store measured data.

9. The wireless measuring device according to claim 3, wherein each of said child units has a measured data storing unit to store measured data.

10. The wireless measuring device according to claim 2, wherein said measuring unit is a temperature measuring unit.

11. The wireless measuring device according to claim 3, wherein said measuring unit is a temperature measuring unit.

12. The wireless measuring device according to claim 4, wherein said measuring unit is a temperature measuring unit.

* * * * *